United States Patent
Licklider et al.

(10) Patent No.: US 10,142,344 B2
(45) Date of Patent: Nov. 27, 2018

(54) CREDENTIAL MANAGEMENT SYSTEM

(71) Applicant: HRB Innovations, Inc., Las Vegas, NV (US)

(72) Inventors: Cale Licklider, Lee's Summit, MO (US); William F. Vander Lippe, Overland Park, KS (US)

(73) Assignee: HRB Innovations, Inc., Las Vegas, NV (US)

( * ) Notice: Subject to any disclaimer, the term of this patent is extended or adjusted under 35 U.S.C. 154(b) by 305 days.

(21) Appl. No.: 14/969,654

(22) Filed: Dec. 15, 2015

(65) Prior Publication Data

US 2017/0171209 A1 Jun. 15, 2017

(51) Int. Cl.
*H04L 29/06* (2006.01)

(52) U.S. Cl.
CPC .......... *H04L 63/10* (2013.01); *H04L 63/0428* (2013.01); *H04L 63/12* (2013.01)

(58) Field of Classification Search
CPC ......... H04L 63/10; H04L 63/12; H04L 63/04; H04L 63/0428
See application file for complete search history.

(56) References Cited

U.S. PATENT DOCUMENTS

| | | | | |
|---|---|---|---|---|
| 2003/0188201 A1* | 10/2003 | Venkataramappa | .... | G06F 21/31 726/6 |
| 2009/0187831 A1* | 7/2009 | Tiwana | ................ | G06Q 10/107 715/752 |
| 2011/0276637 A1* | 11/2011 | Thornton | ................ | H04L 51/08 709/206 |
| 2014/0101129 A1* | 4/2014 | Branish, II | ........ | G06F 17/30893 707/714 |

* cited by examiner

*Primary Examiner* — Ayoub Alata
(74) *Attorney, Agent, or Firm* — Erise IP, P.A.

(57) ABSTRACT

System, method and media for managing user credentials by securely caching credentials to access shared, secure resources for subsequent reuse. When a user accesses a shared, secure resource for the first time, the system determines credentials for the user, which are then stored in a file readable only by that user but in a location hidden from that user. On subsequent attempts to access the resource, a system process running on behalf of the user accesses the hidden file to prepopulate the user's credentials so that they need not be re-entered. In this way, stored processes can access the resource with the correct user's credentials without requiring that they be entered every time.

16 Claims, 3 Drawing Sheets

CREDENTIAL MANAGEMENT SYSTEM

BACKGROUND

1. Field

Embodiments of the invention generally related to the field of managing user credentials and, more particularly, to systems and methods for securely caching user credentials to access shared, secure resources for subsequent reuse.

2. Related Art

When accessing a shared, secure resource (such as, for example, a database), users must provide credentials (such as a username and password) verifying that they are authorized to access the resource. When users write source code to programmatically access the shared resources, they have traditionally embedded these credentials directly in the source code. However, with increased sharing of source code, this can result in a second user unintentionally accessing the shared resource using the first user's credentials, thereby preventing proper accounting and logging. Furthermore, the second user may be able to recover the first user's (supposedly secret) credentials by looking at the source code and, as a result, be able to impersonate the first user. As such, there is a need for a credential management system that maintains the convenience of credentials embedded directly into source code without compromising security when that source code is shared.

SUMMARY

Discussed herein are techniques for addressing the above problem by providing for a credential management system that securely caches user credentials for subsequent reuse. In a first embodiment, the invention includes a method of securely caching a user's credentials for subsequent reuse, comprising the steps of creating, using a first system-locked stored procedure, a user-locked file containing credentials for the user to access a shared, secure resource; reading, using a second system-locked stored procedure, the user's credentials from the user-locked file; populating the user's credentials into one or more variables accessible from a stored procedure run by the user; and accessing, from the stored procedure run by the user, the shared, secure resource using the user credentials stored in the one or more variables.

In a second embodiment, the invention includes a system for credential management, comprising a shared, secure resource requiring a user's credentials for access, a file system storing a user-locked file containing the user's credentials, and a procedure store storing a system-locked stored procedure programmed to read the user's credentials from the user-locked file and populate the user's credentials into one or more variables and a user stored procedure programmed to call the system-locked procedure to populate the one or more variables and access the shared, secure resource using the one or more variables.

In a third embodiment, the invention includes one or more computer readable media storing a shared, secure resource requiring a user's credentials for access, a user-locked file containing the user's credentials, a system-locked stored procedure programmed to read the user's credentials from the user-locked file and populate the user's credentials into one or more variables, and a user stored procedure programmed to call the system-locked procedure to populate the one or more variables and access the shared, secure resource using the one or more variables.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
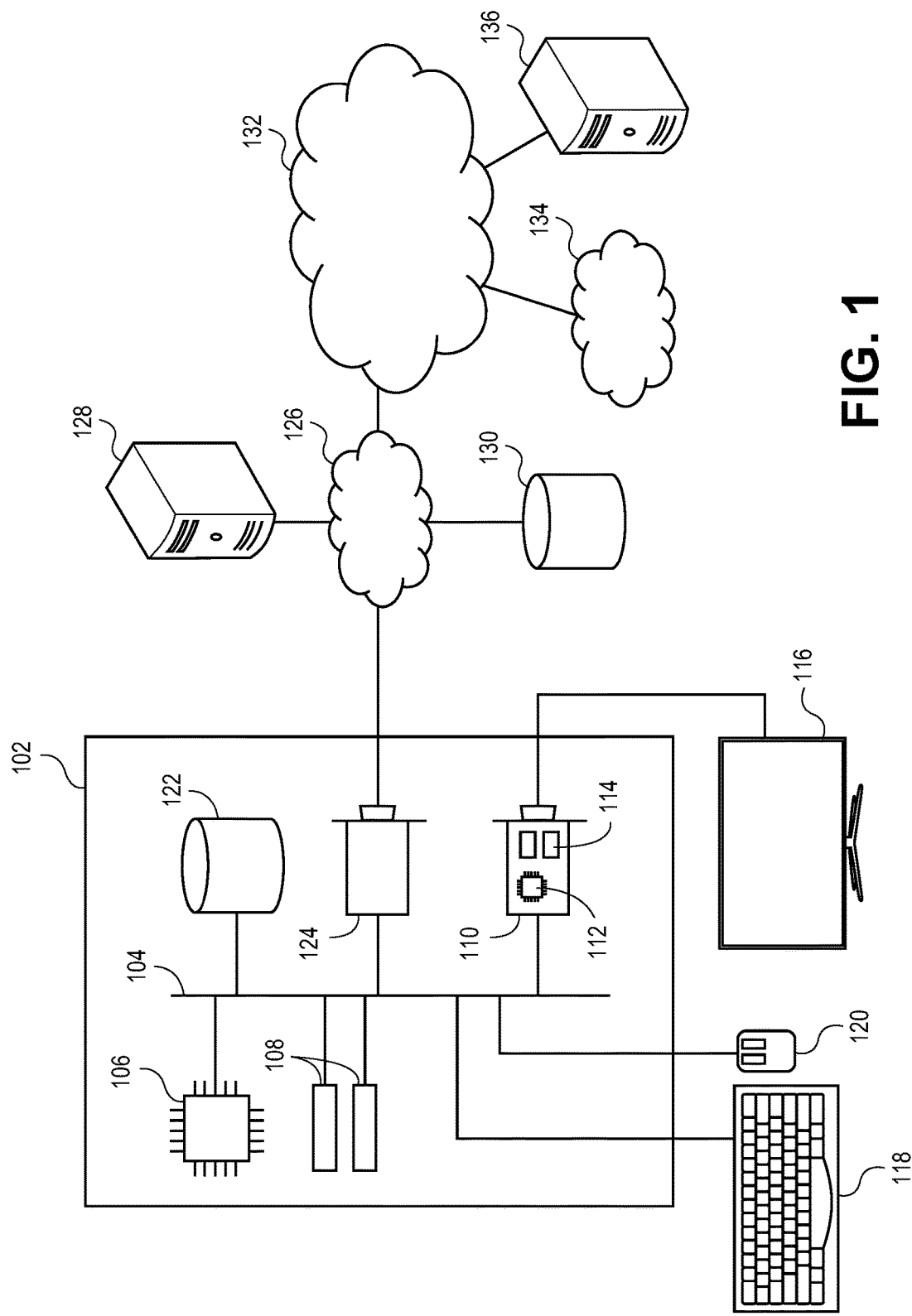
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments provide for an improved method of allowing user access to shared, secure resources such as databases. Generally, when a programmer writes code that accesses such a shared, secure resource, they must provide authentication credentials (e.g., a username and password) in order to be granted access to the resource. However, if care is not taken to provide these authentication credentials in a secure fashion, the security of the shared resource may be compromised. To maintain security, a third party should not be able to recover the credentials to thereby allow access to view, run, or alter the programmer's code. Furthermore, a third party with access to the system on which the code is executed should not be able to recover the credentials from that system. However, to maintain usability, the user, i.e., the programmer, should not have to enter their credentials every time they run the code.

To meet these needs, the user's credentials are determined once, upon first running the code (for example, the credentials may be automatically determined based on the user's sign-on, or the user may run a separate process to enter the credentials). These credentials are then stored securely in a file by a first stored procedure to which only the user has access. In this way, users cannot determine each other's credentials, and each user accesses the shared, secure resource under their own credentials. When other code is subsequently run by the same user, their credentials are loaded from this file into the running code and can be used to access the shared, secure resource without user intervention.

However, a basic implementation of user-locked files, without further protection, introduces another security flaw. A "user-locked" file is a file to which only a particular user (the user to whom the file is locked) has access. If the user's account on the system storing the user-locked file is compromised (for example, if the user is tricked into running malicious code), then that account can be used to access the user-locked file and thereby recover the user's authentication credentials. One way of mitigating such an attack is to store the user-locked files for each user in a hidden location. The code storing and retrieving the credentials from hidden files must then be system-locked to prevent malicious users from viewing it to determine the location in which the user-locked files are stored. This approach provides multi-level, redundant security for user credentials while maintaining convenient operation for users of the system.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 104 may not be a physically separate card but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removeably attached.

Computer-readable media include both volatile and nonvolatile media, removable and nonremovable media and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
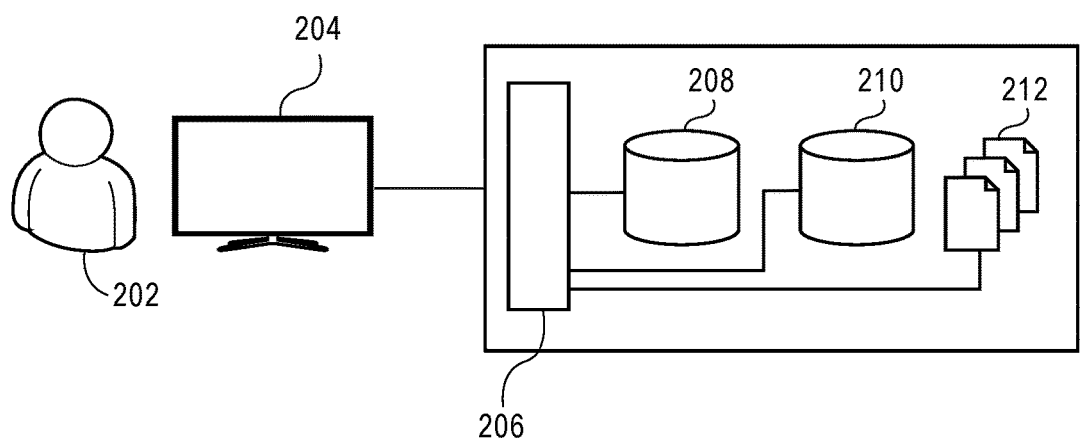
FIG. 2 depicts a system suitable for the operation of certain implementations.

Turning now to FIG. 2, a credential management system is depicted. User 202 uses front end 204 to access system 206. User 202 may be a programmer, end user, administrator, or other user of system 206. User 202 further has credentials allowing access to shared, secure resource 208. For example, in some embodiments, these credentials may comprise a username and password. In other embodiments, these credentials may comprise the private key of an asymmetric key pair or a shared symmetric key. In still other embodiments, authentication credentials can comprise a token or seed used to generate authentication information exchanged between user 202 and system 206 in order to access secure, shared resource 206. Broadly, these credentials are anything that verifies that user 202 is authorized to access secure, shared resource 208. User 202 may further have credentials to access system 206 itself, which may be the same as the credentials used to access shared, secure resource 208 or different.

Front end 204 may be integrated into system 206 or a separate system. For example, front end 204 may be the local desktop or laptop computer of user 202. In some embodiments, front end 204 may store user 202's authentication credentials. Alternatively or in addition, front end 204 can provide a user interface for user 202 to input their authentication credentials. System 206, in some embodiments, can be a computer or cluster of computers as described above with respect to FIG. 1 and has local or remote access to one or more data stores storing various types of information. As discussed above, these data stores can take the form of file systems, databases, or other organizations of data. Furthermore, although FIG. 2 depicts them separately, secure, shared resource 206, procedure store 210 and file system 212 may all be a common data store, may be stored on separate data stores, or may even be stored on different computers connected via a local network or the Internet.

Secure, shared resource 208 may be any form of data store that requires authentication to access. Such resources are commonly available to multiple users such as user 202 but need not be. In some embodiments, system 206 may include multiple shared, secure resources such as shared, secure resource 208. These resources may all use the same user credentials, or different credentials may be required for each shared, secure resource. One example of a shared, secure resource is a database containing sensitive and/or personally identifiable information about individuals, such as financial or tax information. Such a database may be accessed programmatically (for example, in the course of preparing a taxpayer's tax return), interactively, or a combination of both. Such a database may also be accessed differently (e.g., using different authentication credentials) for different purposes. For example, tax preparation software may use a first set of authentication credentials (regardless of the end user) to access the database when preparing tax returns, while tax analysts may use individualized authentication credentials (for example, for the purposes of accountability) when accessing the database to perform statistical analyses of tax returns.

As described above, authenticated users such as user 202 can access shared, secure resource 208 either programmatically, via programs or stored procedures, or interactively by entering queries, obtaining results, refining and re-entering the queries, and so forth. Stored procedures may be stored in procedure store 210. For example, a user may have developed a stored procedure to analyze sales data for the past month, based on information from the shared, secure resource. The user may further wish to re-run this procedure each month to obtain updated sales data analysis results for the current month. By storing the query in procedure store 210, it can easily be re-run whenever needed, or called as a part of another stored or interactive query. Individual stored procedures may themselves both include authentication credentials and require authentication credentials to run. For example, a given class of users may be permitted to run certain stored procedures that access (in carefully limited ways) a shared, secure resource to which the user does not otherwise have unrestricted or direct access. Such a stored procedure may include, as a part of its code, authentication credentials.

Thus, in some embodiments, the user can be granted limited access to a particular shared secure resource without the need to grant them full access to that resource as follows. A user can be granted permission to run a particular stored procedure accessing the shared, secure resource in a particular, limited way, but the user does not otherwise have full, unrestricted access to the shared, secure resource. Such may be desirable to compartmentalize each user's access to the shared, secure resource, to restrict a particular user's access to information stored on the shared, secure resource, or to restrict a particular user's ability to modify the information stored on the shared, secure resource. For example, the user may be granted access to a stored procedure that reads the secure, shared resource, but not be granted the full access to that resource that would also allow modifying or deleting that resource. In situations where the shared, secure resource is storing numerous lines of source code with access to accompanying databases of information, it may be desirable to only allow the user to run a stored procedure to insure the integrity and uniformity of the shared, secure resource. As another non-limiting example, there may be situations where a particular user needs access to a specific module of source code or specific database of information on the shared, secure resource. In such a case, the user may be authenticated to run a stored procedure that provides access to the specific module or database but does not otherwise allow unrestricted access to the shared, secure resource. In this way, the user can use their own credentials to access resources in limited ways without the need to "borrow" another user's credentials.

To enable such access restrictions, stored procedures (and other data resources, such as databases and files) may be locked so that they can only be read (and, in some embodiments, written to and executed) by particular users. For example, the above-described stored procedure to allow particular users access to a shared, secure resource to which they do not otherwise have unrestricted access could be implemented by creating a system-locked stored procedure containing the authentication credentials needed to access the shared, secure resource. A system-locked stored procedure is a procedure that cannot be read by any ordinary users, but only by the system itself (for example, in order to execute the stored procedure) and, in some embodiments, by administrators of the system. Such system-locked stored procedures may be configured such that they can be executed by users even though they cannot read or write them. In this way, the user can access the secured, shared resource for the limited purposes in the system-locked stored procedure but not escalate their privileges to gain general access to the secure resource by reading the stored procedure and extracting the credentials from it.

Although this specification uses the term "stored procedure" to refer to any code segment which is stored in a data store for later execution, such stored procedures may be known by other names depending on context. For example, executable binary programs and interpreted scripts are also stored procedures in this sense. Stored procedures need not be self-contained but can be imported and executed by other stored procedures or interactive commands.

Also associated with system 206 is file system 212, which can be used for storing other data, including operating system data for system 206. As described above, shared, secure resource 208 and procedure store 210 can be implemented on top of or in addition to file system 212. As with procedure store 210, individual files can be locked to a particular user (so that only that user can read them) or to the system such that only system-level accounts can read them. The credentials used to access user-locked files on file system 212 may be the same as the credentials used to access shared, secure resource 208, or they may be different. In some embodiments, file system 212 may be incorporated into front end 204 instead of (or in addition to) system 206, or may be shared between front end 204 and system 206.

In some embodiments, procedures in procedure store 210 can access file system 212. In some such embodiments, the authentication credentials used by the user running the stored procedure to log in are automatically reused if necessary to access files stored on file system 212. In this way, different users running the same stored procedure would be able to access different files on file system 212. This difference in access based on the user allows for the embodiment discussed briefly below and in greater detail with respect to FIG. 3.

When a stored procedure requires user authentication credentials to access shared, secure resource 208, a special, system-locked stored procedure can be called instead of embedding the credentials of its author in the stored procedure or always prompting for the credentials of the user running the stored procedure. The special, system-locked stored procedure looks in a hidden location to see if a user-specific, user-locked file exists. In some embodiments, this file contains only credential information for the user to whom it is locked. This file, if it exists, contains the credentials necessary for the user to access the shared, secure resource. If the file does not exist, the special, system-locked procedure (or another system-locked procedure) determines the user's credentials, which are then used to create the user-specific, user-locked file and access shared, secure resource 208. For example, the credentials can be automatically determined based on the user's sign-on, or the user can specify their credentials. In some embodiments, the user can execute a separate process prior to executing the user code to create the user-locked file with their credentials. Because no other users can access this file, the user's credentials remain secure, but the user is spared the inconvenience of entering the credentials each time.

Figure 3:
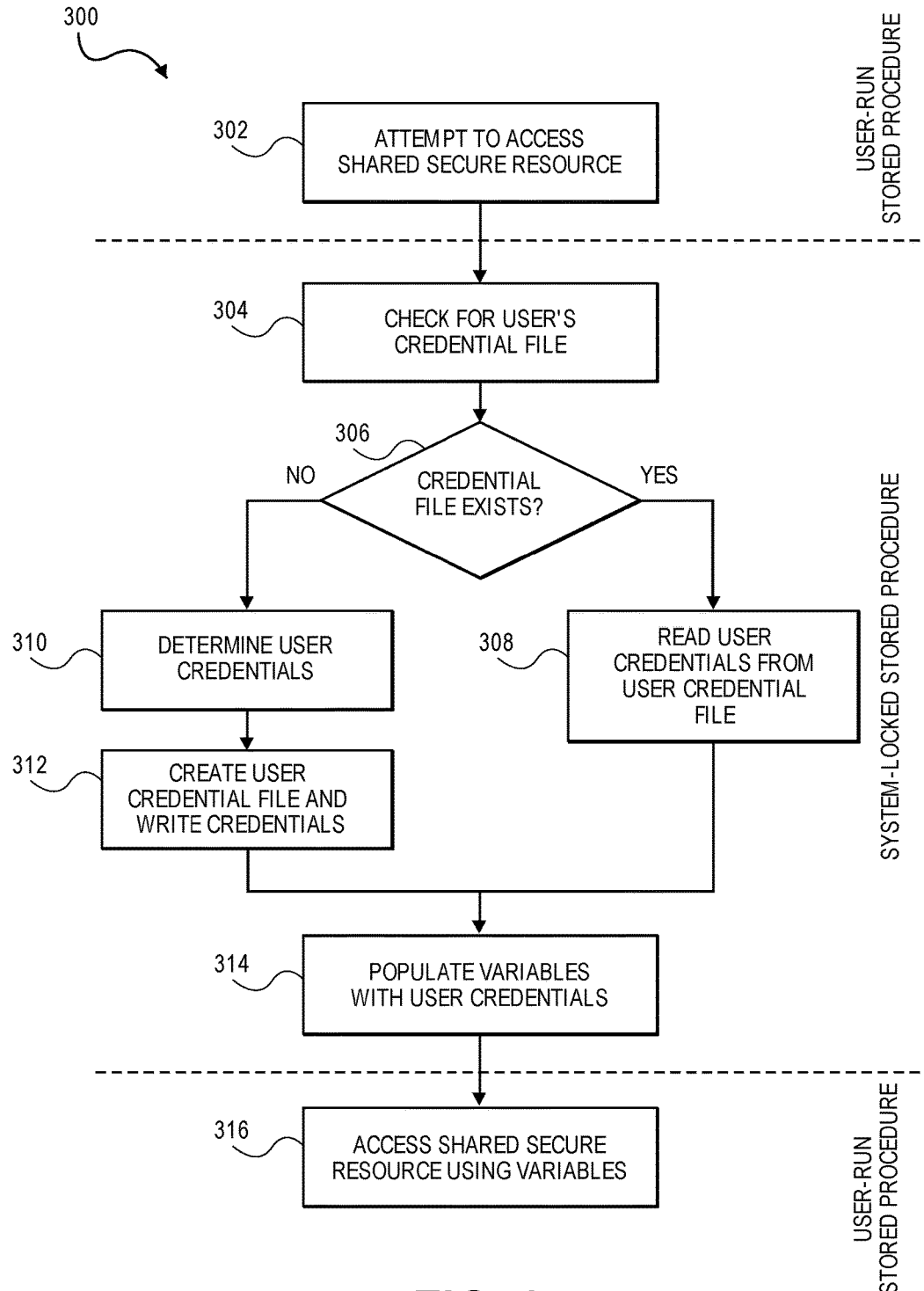
FIG. 3 depicts a flowchart illustrating a method of securely caching user authentication credentials for subsequent reuse in accordance with embodiments.

Turning now to FIG. 3, a flowchart depicting a method of securely caching user authentication credentials for subsequent reuse is depicted and generally referred to by reference numeral 300. Initially, at step 302, user 202 executes code that attempts to access shared, secure resource 208. This code can be part of a stored procedure written by the user (or by another user) or as a part of an interactive session. In other embodiments, rather than executing when the user executes code attempting to access a shared, secure resource, the subsequent steps execute at the beginning of every stored procedure run by the user or at the beginning of an interactive session, as a part of the process of setting up the execution environment.

Next, at step 304, file system 212 is checked to see if the user's credential file exists (i.e., whether the user-locked file has been previously created). For example, a user's credential file may not exist because the user has not accessed the particular secure, shared resource previously. In other embodiments, user credential files are only maintained for a limited time, so that the user only needs to enter their credentials once a day (or other time period). In such embodiments, the user credential file may not exist because it was deleted at the end of the previous day, or because the user has not accessed the shared, secure resource recently.

In some embodiments, all user credential files are user-locked to the user whose credentials they contain and are stored in a hidden directory whose location users do not know. To prevent users from learning where credential files are stored, steps 304 through 314 may be executed by a system-locked stored procedure that users are unable to view and thereby determine the hidden location of the user-locked files. In other embodiments, more or fewer steps are carried out by the system-locked stored procedure.

Next, at decision 306, processing is determined based on whether a credential file for the user exists. If the credential file exists, processing proceeds to step 308. If the credential file does not exist, processing instead skips to step 310. In some embodiments, a first system-locked stored procedure is used to create the user-locked file and populate it with the user's credentials, and a second system-locked stored procedure is used to read the credentials from the user-locked file if it exists. In other embodiments, all of this functionality is performed by the same stored procedure. At step 308, the user's credentials are read from the user-locked credential file. In some embodiments, the credentials may be encoded or encrypted, and are decoded or decrypted using a key included in the system-locked stored procedure at this step. In some embodiments, the user credential file may contain a plurality of credentials for the user to access a plurality of shared, secure resources. In such embodiments, the appropriate credential is extracted from the plurality at this point. Processing then proceeds to step 314.

If the user credential file did not exist, on the other hand, processing continues from decision 306 to step 310, where the user's credentials are determined. As described above, the credentials may be determined automatically, the user may enter their credentials, or the user may execute a separate process to automatically create the user credential file. Also as described above, the user's credentials may take a variety of forms and the interface for the user to enter them can be adjusted accordingly. When the credential file is being created, the user may also have to enter supplementary authentication information that is not directly needed to access shared, stored resource. For example, the user may have to enter a one-time code from a two-factor authentication token, to respond to a message sent to their cell phone, or to enter a biometric identifier.

Next, at step 312, the user credential file is created and the user's credentials are stored in it. As mentioned above, user credentials may also be encoded or encrypted at this step, potentially using a key included in the system-locked stored procedure. In some such embodiments, the entire user-locked file is encrypted; in other embodiments, only authentication credentials in the user-locked file are encrypted. As a part of this step, the permissions of the users credential file can also be adjusted to make it user-locked. For example, under the UNIX permissions model, the credential file might be given a permissions mask of 0600. In an alternate embodiment, a permission mask of 0400 might be used instead. Of course, any method of creating user-locked files on any operating system is contemplated as being within the scope of the invention.

Next, processing proceeds to step 314 regardless of whether the user credential file previously existed or was created. At that step, the user's credentials are populated into programming-language variables accessible to the stored procedure being executed by the user. Broadly, variables are symbolic names associated with values and whose associated values may be assigned. Thus, the author of the stored procedure may refer to the user's authentication credentials by their symbolic name, and the appropriate values will be substituted at run time. For example, macro variables or variables of global scope could be used, depending on the programming language in which the stored procedure is written.

Finally, at a step 316, the stored procedure being run by the user accesses the shared, secure resource using the credentials of the user, as populated into the variable or variables by the system-locked stored procedure. In this way, the author of the user stored procedure can call the system-locked stored procedure and then authenticate as needed to access the shared, secure resource using the variables without the need to deal further with the authentication credentials, and the appropriate credentials for the user will be automatically used in a secure fashion.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of securely caching a user's credentials for subsequent reuse, comprising the steps of:
   automatically, based on a sign on by the user, determining whether a user-locked file containing credentials for the user exists in a location hidden from the user;
   if the user-locked file containing credentials for the user does not exist:
      automatically creating, in the location hidden from the user, using a first system-locked stored procedure, the user-locked file containing credentials, wherein the credentials will be utilized to access a shared, secure resource;
   if the user-locked file containing credentials for the user does exist:
      reading, using a second system-locked stored procedure, the user's credentials from the user-locked file;
   populating the user's credentials into one or more variables accessible from a stored procedure run by the user; and
   accessing, from the stored procedure run by the user, the shared, secure resource using the user credentials stored in the one or more variables.

2. The method of claim 1, wherein the user-locked file is encrypted.

3. The method of claim 1, wherein the user-locked file contains a plurality of credentials for the user to access a plurality of shared, secure resources.

4. The method of claim 1, wherein the shared, secure resource is a database.

5. A system for credential management, comprising one or more computer-readable media including:
   a shared, secure resource requiring a user's credentials for access;
   a file system, configured to store a user-locked file containing the user's credentials in a location hidden from the user; and
   a procedure store, storing:
      a first system-locked stored procedure programmed to automatically determine, based on a sign-on by the user, whether the file system stores the user-locked file containing credentials for the user;
      a second system-locked stored procedure programmed to automatically create, in the location hidden from the user, the user-locked file containing credentials for the user if the first system-locked procedure determined that the file system does not already store the user-locked file containing credentials for the user, wherein the credentials will be utilized to access a shared, secure resource;
      a third system-locked stored procedure programmed to read the user's credentials from the user-locked file and populate the user's credentials into one or more variables if the first system-locked procedure determined that the file system stores the user-locked file containing credentials for the user; and
      a user stored procedure programmed to use the one or more variables to access the shared, secure resource.

6. The system of claim 5, wherein the file system is configured to store a plurality of user-locked files, each user-locked file of the plurality of user-locked files storing credentials for a different user and locked to that different user.

7. The system of claim 5, wherein the user-locked file is encrypted using a key contained in the third system-locked stored procedure.

8. The system of claim 5, further comprising a front end providing a user interface for the user to provide the user credentials to create the user-locked file.

9. The system of claim 5, wherein the shared, secure resource is a database.

10. The system of claim 5, wherein the user requires login credentials to access the system and wherein the login credentials to access the system are different from the user credentials to access the shared, secure resource.

11. One or more computer readable media storing:
   a shared, secure resource requiring a user's credentials for access;
   a file system operable to store a user-locked file containing the user's credentials in a location hidden from the user;
   a first system-locked stored procedure programmed to automatically determine, based on a sign-on by the user, whether the file system stores the user-locked file containing the user's credentials;
   a second system-locked stored procedure programmed to create, in the location hidden from the user, the user-locked file containing credentials for the user if the first system-locked procedure determined that the file system does not already store the user-locked file containing credentials for the user, wherein the credentials will be utilized to access a shared, secure resource;
   a third system-locked stored procedure programmed to read the user's credentials from the user-locked file and populate the user's credentials into one or more variables if the first system-locked procedure determined that the file system stores the user-locked file containing credentials for the user; and
   a user stored procedure programmed to use the one or more variables to access the shared, secure resource.

12. The media of claim 11, the file system further operable to store a plurality of user-locked files, each user-locked file of the plurality of user-locked files storing credentials for a different user and locked to that different user.

13. The media of claim 11, wherein the user-locked file is encrypted using a key contained in the third system-locked stored procedure.

14. The media of claim 11, wherein the user-locked file contains a plurality of credentials for the user to access a plurality of shared, secure resources.

15. The media of claim 11, wherein the shared, secure resource is a database.

16. The media of claim 11, further storing a plurality of shared, secure resources.

* * * * *